(12) United States Patent
Lee

(10) Patent No.: US 6,332,699 B1
(45) Date of Patent: Dec. 25, 2001

(54) AUXILIARY LIGHTING OF RIGHT AND LEFT BEARINGS FOR AUTOMOBILE

(76) Inventor: Hyun Jo Lee, 657-117, Shinam-Dong, Dong-Gu, Daegu (KR)

( * ) Notice: Subject to any disclaimer, the term of this patent is extended or adjusted under 35 U.S.C. 154(b) by 0 days.

(21) Appl. No.: 09/541,610

(22) Filed: Apr. 3, 2000

(51) Int. Cl.⁷ .................................................. B06Q 1/12
(52) U.S. Cl. .................... 362/466; 362/251; 362/525; 362/544; 340/465
(58) Field of Search ................... 362/240, 241, 362/244, 245, 251, 464–466, 523, 525, 543, 544, 41; 340/465, 475

(56) References Cited

U.S. PATENT DOCUMENTS

| | | | |
|---|---|---|---|
| 1,752,289 | * | 4/1930 | Call ........................................ 340/465 |
| 2,042,396 | * | 5/1936 | Hicks ...................................... 362/544 |
| 2,175,848 | * | 10/1939 | Metcalf ................................. 340/465 |
| 5,428,512 | * | 6/1995 | Mouzas ................................. 362/464 |
| 5,536,975 | * | 7/1996 | Jennings ............................... 362/464 |
| 5,988,837 | * | 11/1999 | Eichhorn et al. .................... 362/464 |
| 6,015,219 | * | 1/2000 | Kelly ..................................... 362/544 |
| 6,176,590 | * | 1/2001 | Prevost et al. ....................... 362/464 |

* cited by examiner

*Primary Examiner*—Alan Cariaso
(74) *Attorney, Agent, or Firm*—Jacobson Holman, PLLC

(57) ABSTRACT

An auxiliary lighting system which provides additional light for right and left bearings of an automobile when driven at night. The lighting system includes a lighting body having a front protrusion and an interior compartment within which right and left lighting units are mounted, each of the right and left lighting units being arranged at an angle of about 45° from the front protrusion. The lighting body is mounted to the front part of the automobile and can be adjusted to direct the illumination generated by the lighting units more upwardly or downwardly relative to the road. A sensor operating piece and proximity sensors attached to the steering wheel provide input to a microcomputer circuit which actuates the right or left lighting unit in response to a right or left turn of the steering wheel, respectively.

7 Claims, 11 Drawing Sheets

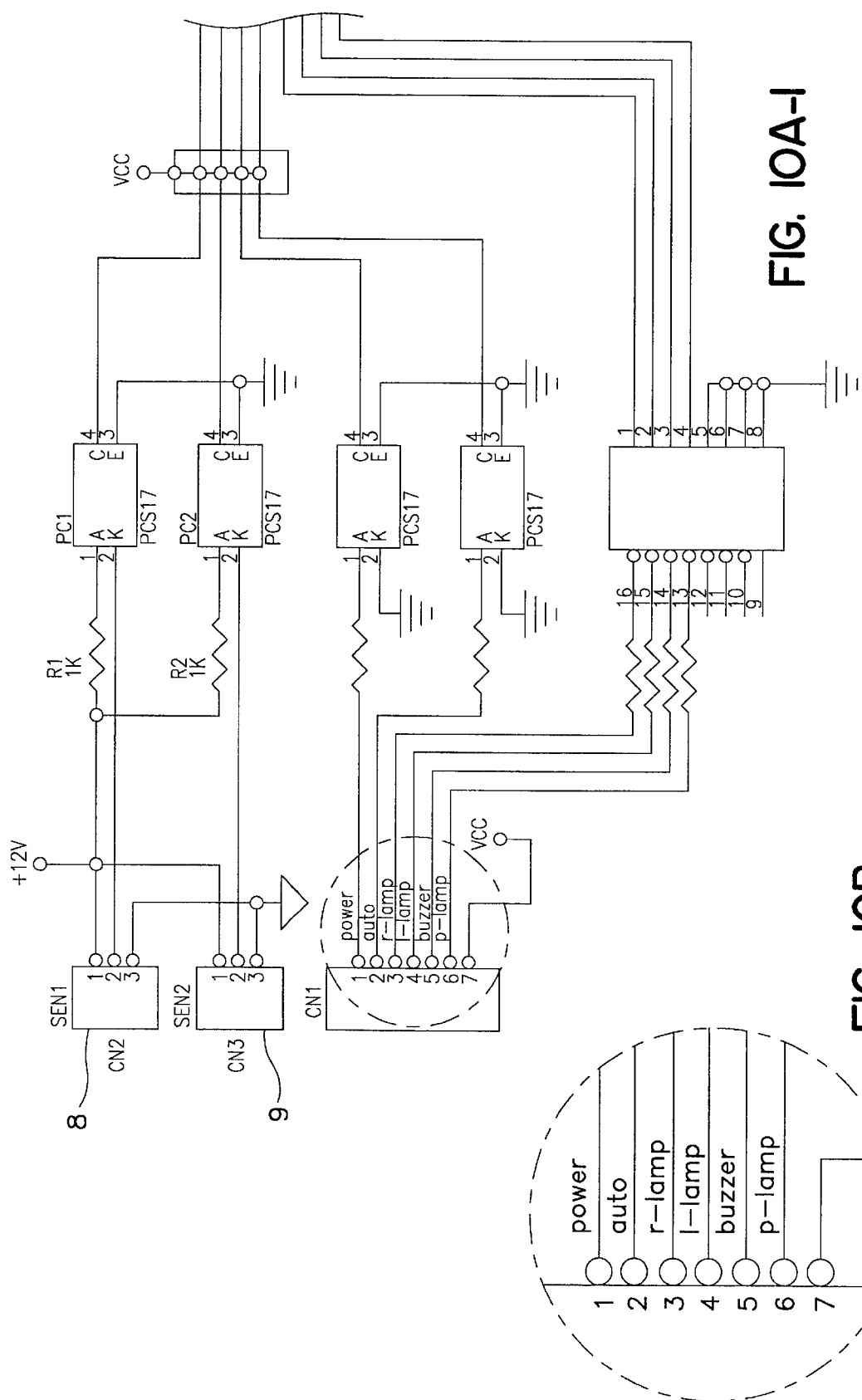

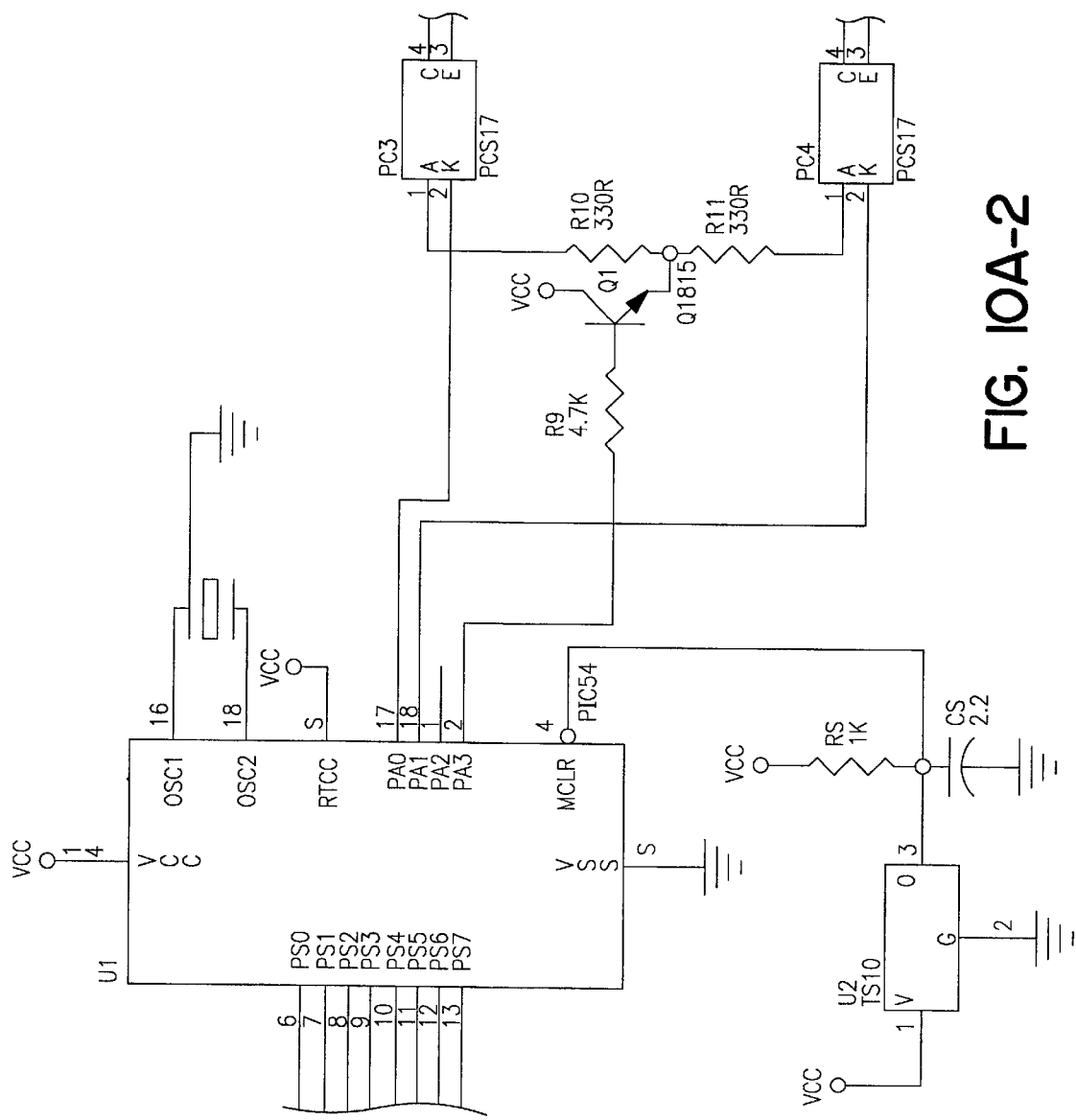
FIG. IOA-2

AUXILIARY LIGHTING OF RIGHT AND LEFT BEARINGS FOR AUTOMOBILE

BACKGROUND OF THE INVENTION

1. Field of the Invention

The present invention relates to an auxiliary lighting of right and left bearings for automobile mounted to the front end of the hood or to the middle portion of the front bumper of the automobile for giving light to the right or left direction of the automobile, and more particularly to an auxiliary lighting of right and left bearings for giving light to the right or left direction when the driving direction of the automobile which are driven along the regular direction is changed, resulting in security of a field of vision and easy monitoring around the automobile, whereby it is possible to drive the automobile in safety.

2. Description of the Prior Art

There are headlights mounted to the right and left sides of the front part of the automobile for giving light on the front area, whereby it is possible to drive the automobile in safety when the automobile is driven at night.

However, since the prior headlights of the automobile do not include any auxiliary lighting of right and left bearings for giving light to the right or the left direction. Consequently, when the driving direction of the automobile is changed into the right direction or the left direction during the automobile is driven along the strait road at night, it is difficult to give rapid light to the direction to be changed. As a result, the initial entry into the turned road is very difficult, whereby it is hard to drive the automobile in safety due to the insufficient monitoring around the automobile especially when the condition of the road is poor and it is a road new to the driver.

SUMMARY OF THE INVENTION

Accordingly, it is an object of the present invention is to eliminate the drawbacks and inconveniences as described above.

The foregoing object is accomplished by providing an auxiliary lighting of right and left bearings mounted to the front end of the hood or to the middle portion of the front bumper of the automobile for giving light to the directions biased at the angle of 45° to the illumination direction of the headlights of the automobile, whereby it is possible to drive the automobile in safety at night.

BRIEF DESCRIPTION OF THE DRAWINGS

The preferred embodiment of the present invention will now be described by way of example with reference to the accompanying drawings in which:

FIGS. 10A-1, 10B, 10A-2, 10A-3, and 10A-4 are circuit diagrams of the microcomputer for operating the auxiliary lighting of right and left bearings for automobile according to the present invention.

DETAILED DESCRIPTION OF THE PREFERRED EMBODIMENT

The auxiliary lighting of right and left bearings for automobile according to the present invention comprises a lighting body; right and left lighting units mounted in the lighting body; and a mounting unit for mounting the lighting body on the predetermined location of the automobile. The right and left lighting units are flickered by the microcomputer to which the signal from a sensor attached to a steering wheel is transmitted for actuating the auxiliary lighting.

Figure 1:
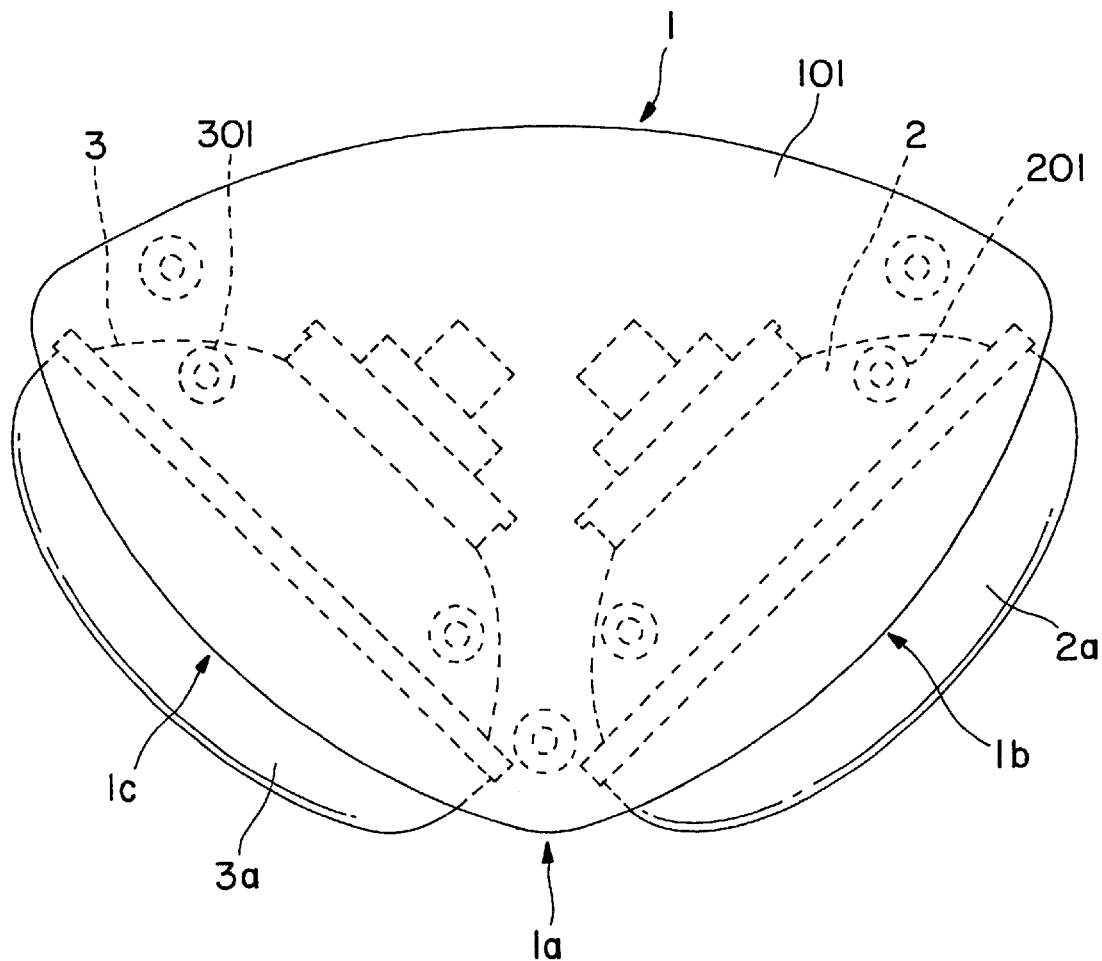
FIG. 1 is a plan view of an auxiliary lighting of right and left bearings for automobile according to the present invention.
Figure 2:
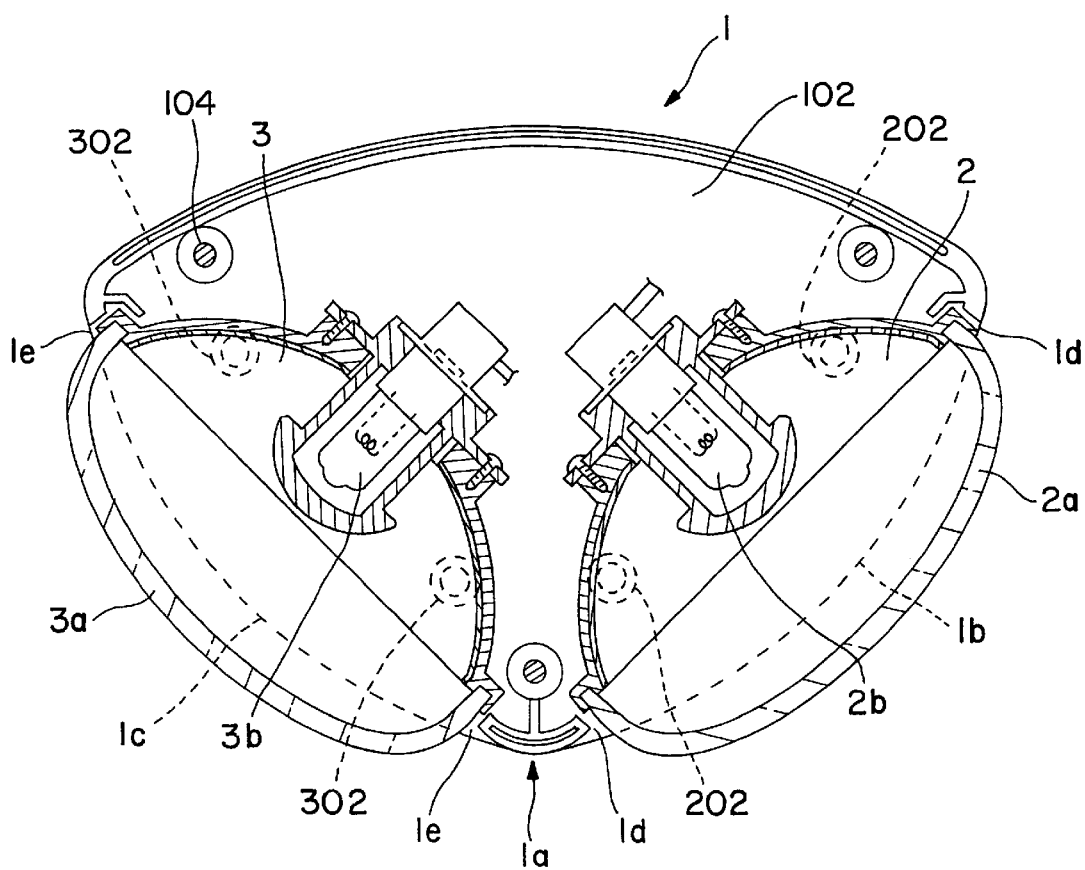
FIG. 2 is a cross-sectional plan view showing of the interior of the auxiliary lighting of right and left bearings for automobile according to the present invention.
Figure 3:
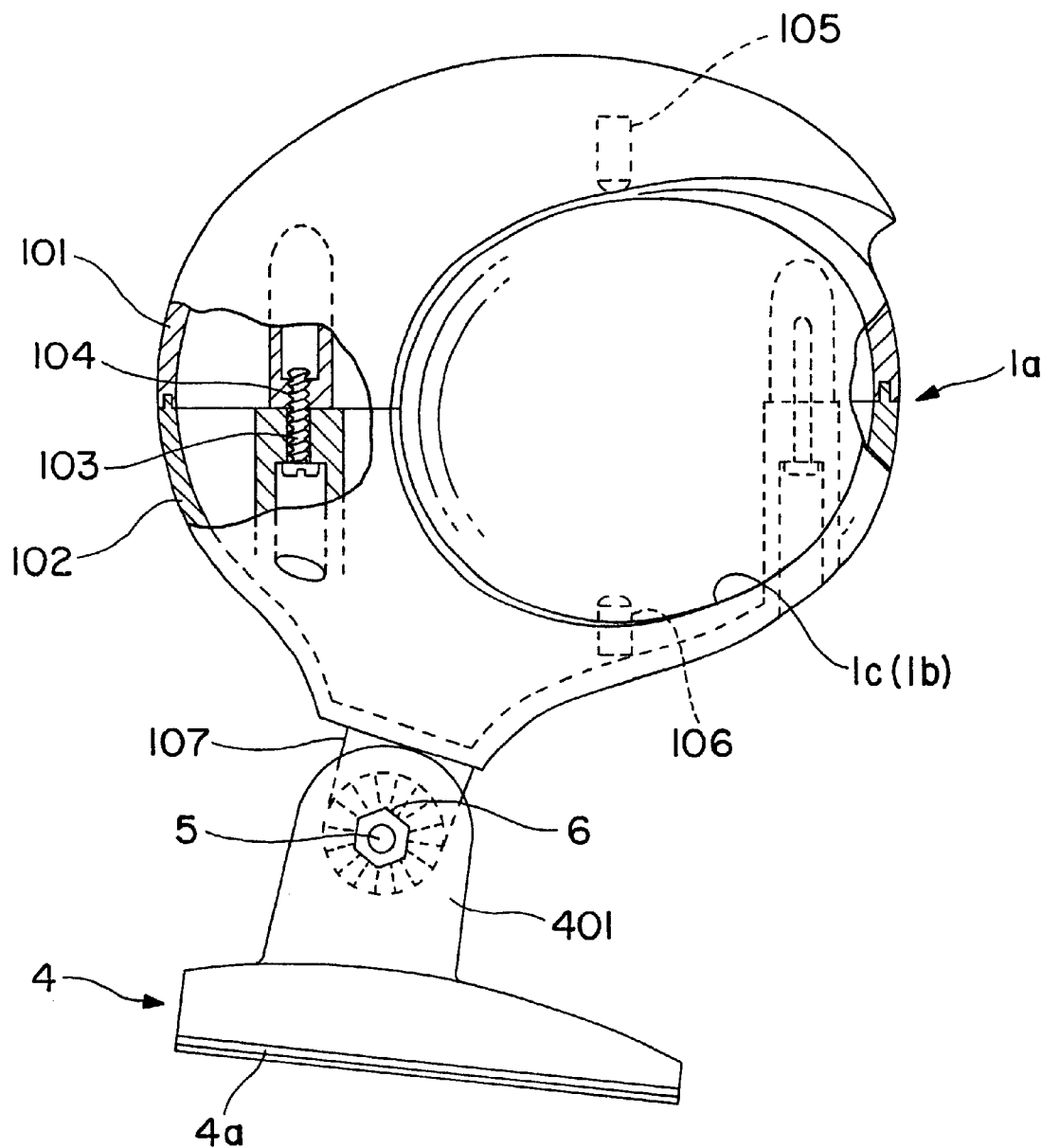
FIG. 3 is a side elevation view, partly in section, of the auxiliary lighting of right and left bearings for automobile according to the present invention.
Figure 4:
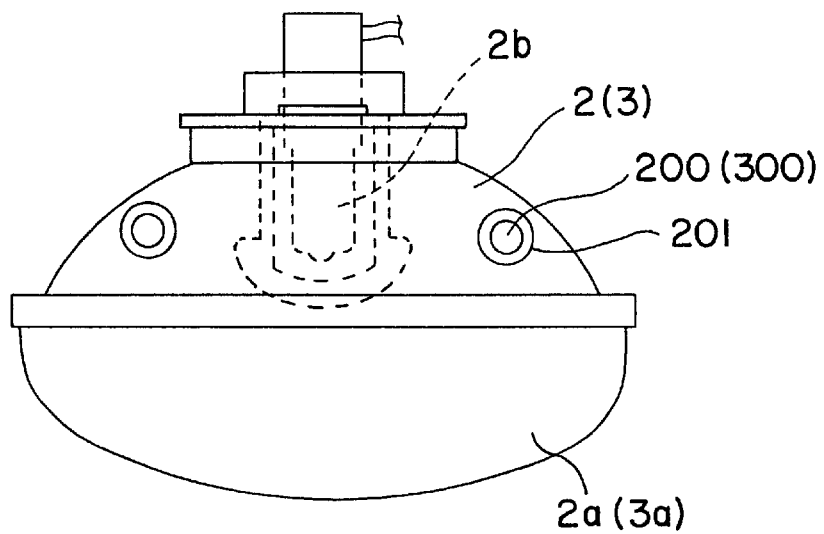
FIG. 4 is an illustrative view of right and left lighting unit according to the present invention.
Figure 5:
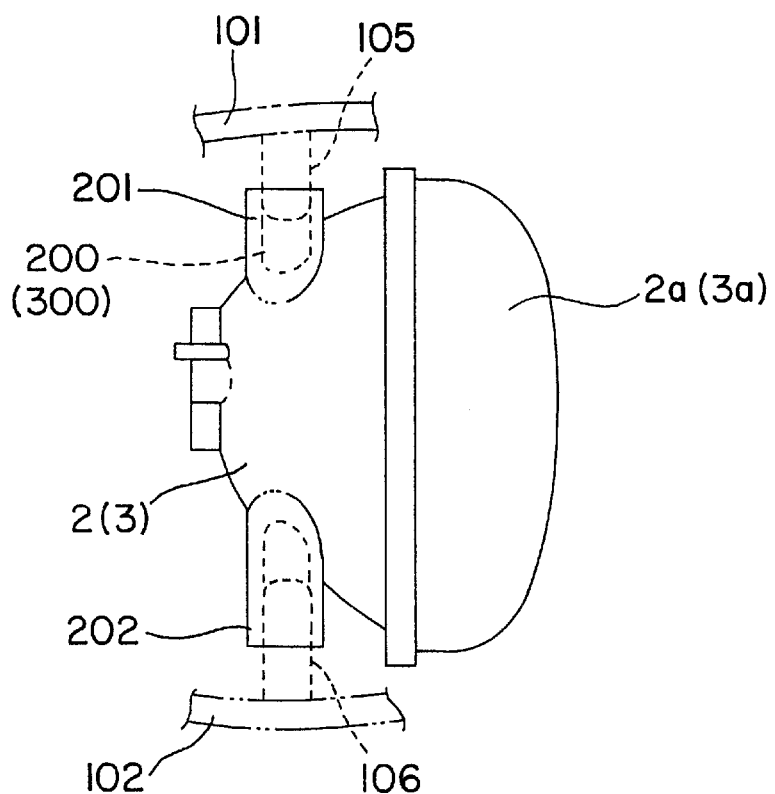
FIG. 5 is a side elevation view of the right and left lighting unit shown in FIG. 4.
Figure 6:
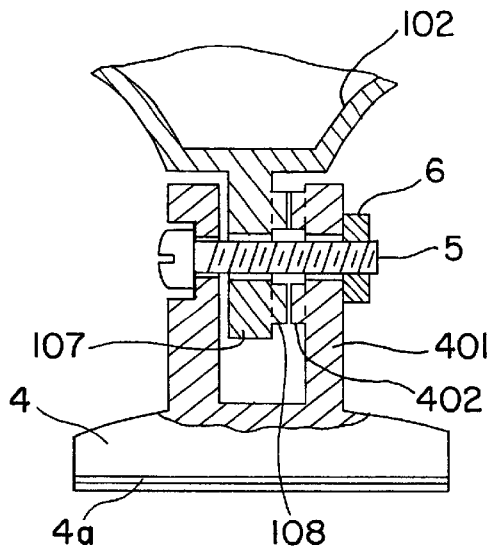
FIG. 6 is a partial cross-sectional view of a mounting unit according to the present invention.
Figure 7:
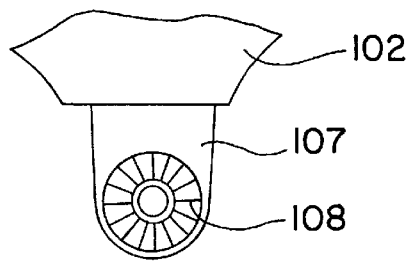
FIG. 7 is an illustrative view showing the exterior of connecting piece according to the present invention.
Figure 8:
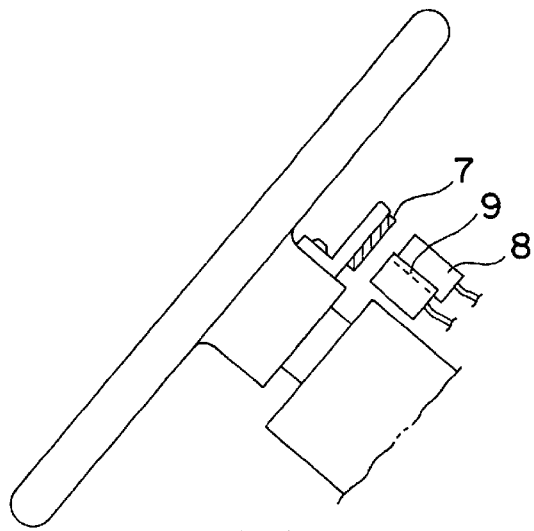
FIG. 8 is an illustrative view showing the mounting status of a sensor.

Especially, the lighting body according to the present invention is divided into upper and lower bodies 101 and 102, which are secured to each other by means of a bolt and nut unit 103 and 104. The lighting body is provided in the interior thereof with a compartment where the parts of the lighting units are mounted. The lighting body 1 is of a shape of triangle (See also FIGS. 1 and 2), and has outer walls 1b and 1c each of which is arranged at the angle of about 45° from a front protrusion 1a of the lighting body 1. The outer walls 1b and 1c have openings 1d and 1e formed thereon respectively, through which lenses 2a and 3a of the right and left lighting units 2 and 3 mounted in the compartment are exposed.

The right and left lighting units 2 and 3 are mounted at a predetermined angle in the compartment such that fixing protrusions 105 and 106 formed in the inner surfaces of the upper body 101 and the lower body 102 of the lighting body 1 are engaged into fixing grooves 200 and 300 formed in engaging tubes 201, 202, 301 and 302 which are of a predetermined length and have fixing grooves 200 and 300 at the upper and lower surfaces of the reflectors. Alternatively, fixing protrusions 201' and 2021 may be engaged into fixing grooves 105' and 106'.

At the lower body 102 of the lighting body is formed a projected connecting piece 107 which is engaged into a supporting recess 401 of a mounting plate 4 by means of a bolt and nut unit 5 and 6. Around the connecting piece 107 is formed a friction projection 108 in radial directions, which is joined with a friction member formed on the inner surface of the supporting groove of the mounting plate 4, whereby the mounting angle of the lighting body 1 can be adjusted. The mounting plate 4 may be attached to the body of the automobile by means of adhesives or by means of a bolt and nut unit.

Figure 9:
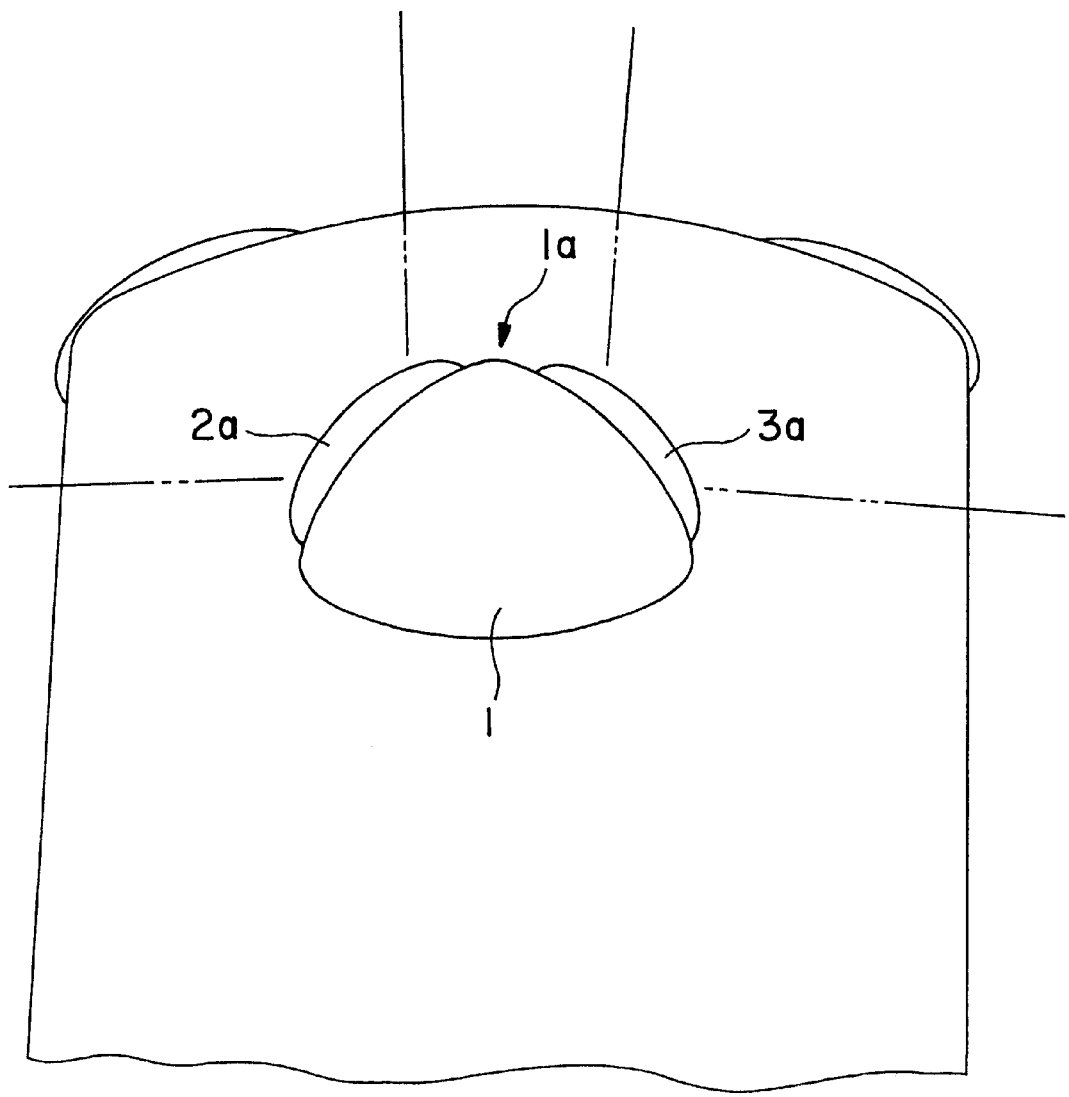
FIG. 9 is an illustrative view showing the mounting status of the auxiliary lighting of right and left bearings for automobile according to the present invention.
Figures 3, 10A:
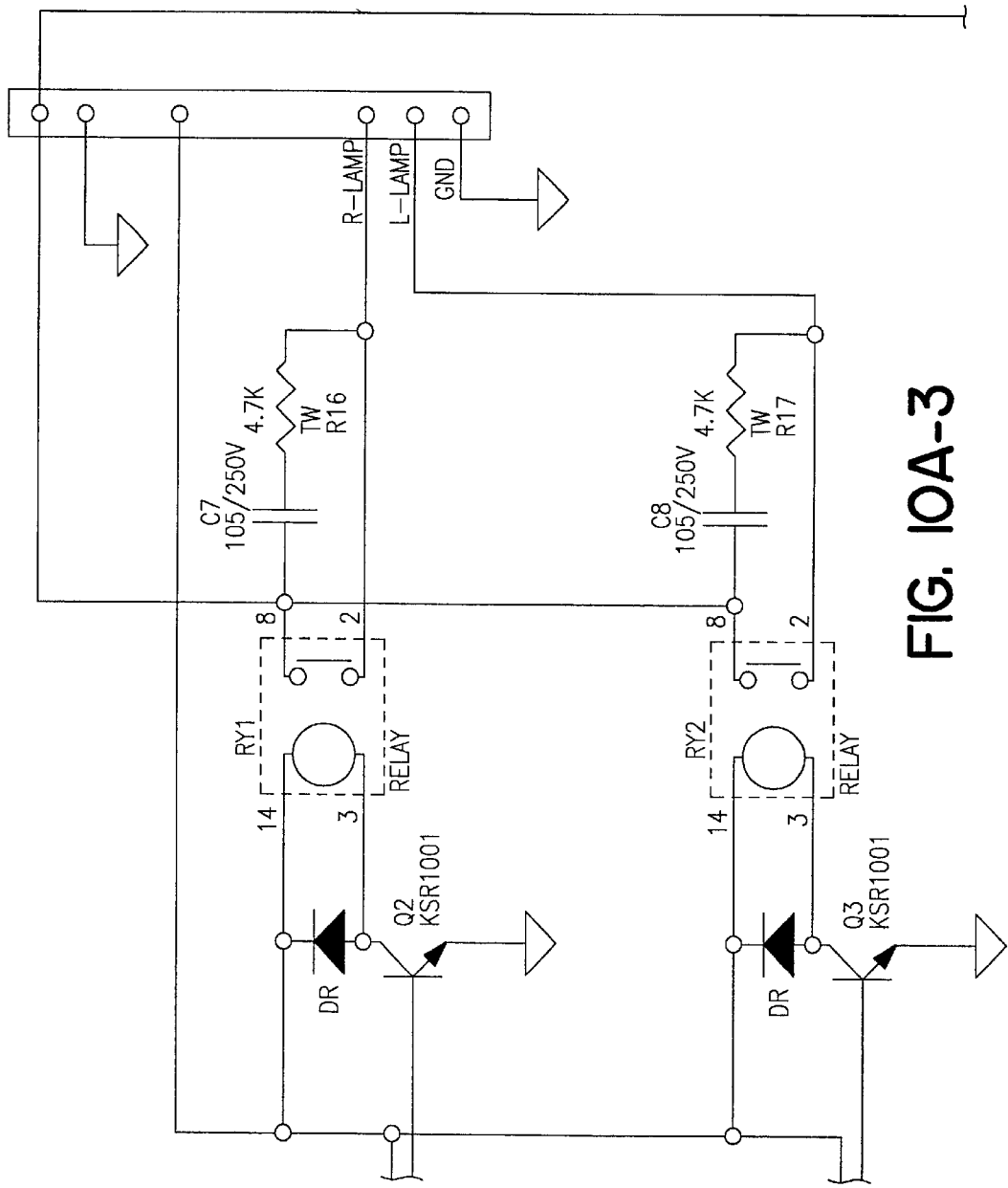
Figures 4, 10A:
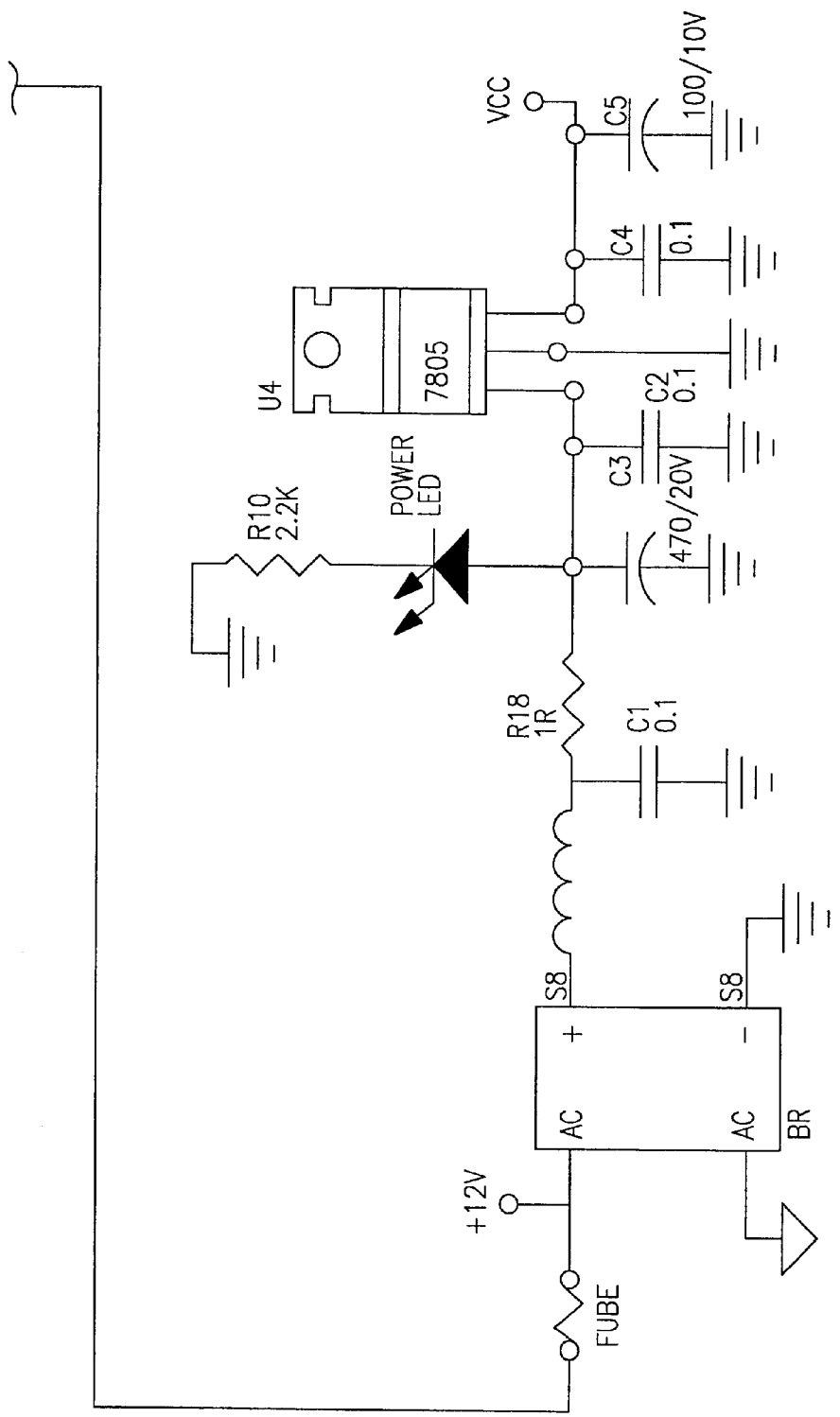
Figure 11:
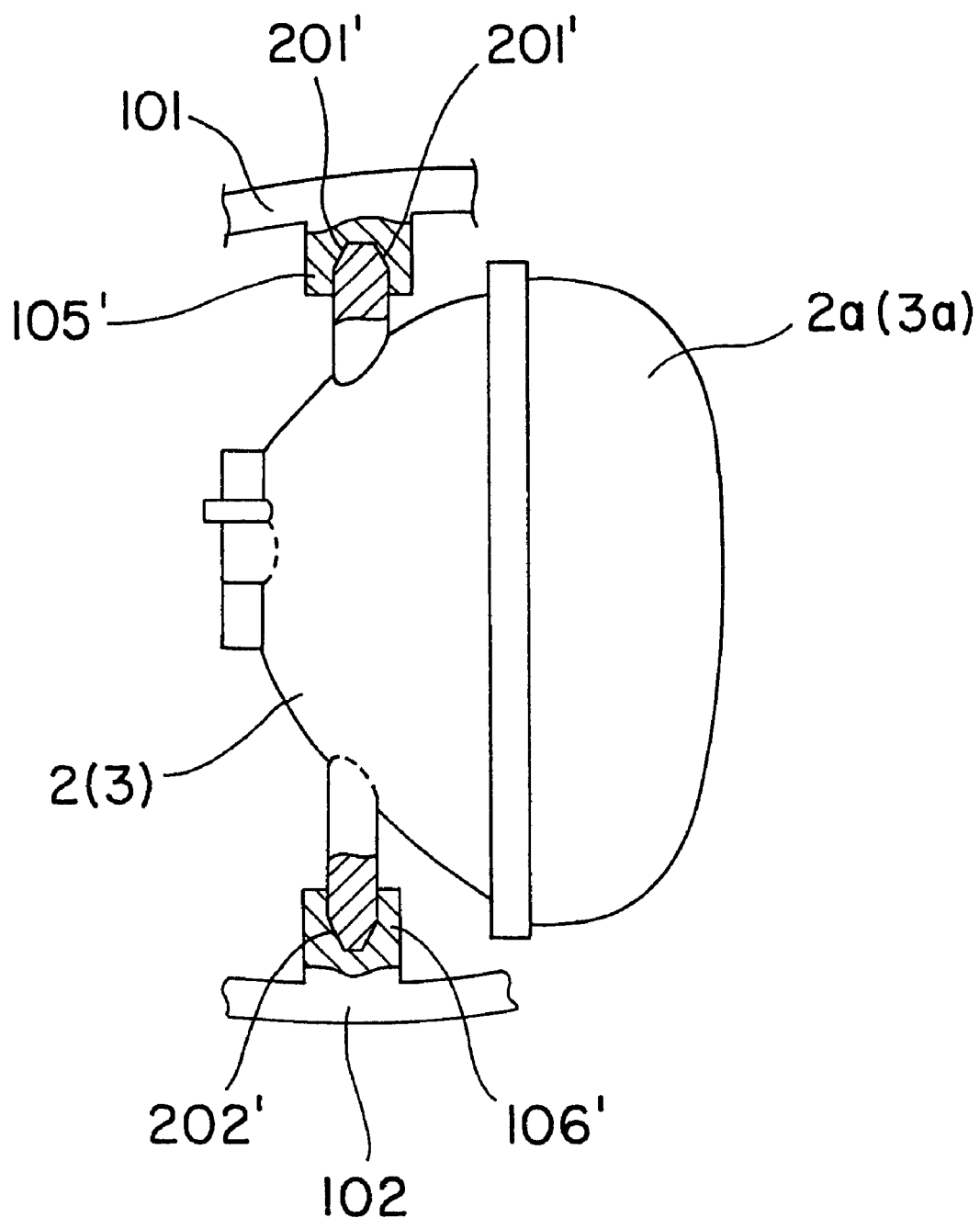
FIG. 11 is an illustrative view of another embodiment of the mounting unit for mounting the auxiliary lighting of right and left bearings for automobile according to the present invention.

In addition, the right and left lighting units 2 and 3 according to the present invention are flickered by the microcomputer circuit as shown in FIG. 9, to which the signal from a sensor operating piece 7 and proximity sensors 8 and 9 attached to a steering wheel is transmitted for actuating the auxiliary lighting.

The auxiliary lighting constructed as mentioned above is mounted to the front end of the automobile such that the front of the lighting body is directed toward the road surface. During the driving of the automobile at night, when the steering wheel is turned to the right or to the left so as to change the direction of the driving to the right or to the left while the automobile is driven under the condition that the headlight is turned on, the sensors mounted on the steering wheel detect the turning of the steering wheel and operate the microcomputer circuit. As a result, when the direction is changed to the left, the left lighting unit is turned on, whereby the auxiliary lighting give light on the. left road. On the contrary, when the direction is changed to the right, the left lighting unit is turned off and then the right lighting unit is turned on, whereby the auxiliary lighting give light on the right road.

With the auxiliary lighting according to the present invention, when the driving direction of the automobile is changed during the automobile is driven at night, the corresponding auxiliary lighting unit is operated toward the changed direction, resulting in security of a field of vision. As a result, the initial entry into the turned road is facilitated, whereby it is possible to drive the automobile in safety. In addition, since the lighting unit mounted in the lighting body is constructed such that it gives light on the road at the angle of 45°, the lighting is accomplished toward the changed driving direction without the turning of the lighting body when the direction of the driving of the automobile is changed. Also, since the right and left lighting unit is mounted into the compartment by having the fixing protrusions which are protruded on the inner surfaces of the lighting body engaged into the fixing grooves of the engaging tubes formed at the upper and the lower part of the reflectors, there is not required additional fastening means to mounting the lighting units into the compartment, resulting in the convenience and simplicity of assembling.

Furthermore, since the lighting body 1 is divided into the upper body and the lower body to open the compartment, it is easy to replace and repair the light bulbs 2b, 3d. When it is required to give light on any side of the road, the right and left lighting unit is turned on by operating additional switch attached to the microcomputer, whereby it is possible to monitor around the automobile.

Consequently, the present invention has effects that as the right and left lighting unit are securely mounted toward predetermined direction of lighting respectively in one lighting body, it is possible to give light to the right or left direction without turning of the lighting units 2 and 3 when it is desired to turn on the lighting. In addition, since the right and left lighting unit is operated by attaching a operation switch or attaching sensors to the steering wheel, it is possible to flicker the light without any errors. Furthermore, if the right and left lighting unit are turned on in another way, it is possible to monitor around the automobile.

What is claimed is:

1. A system for auxiliary lighting of right and left bearings for an automobile, comprising:
   a lighting body divided into upper and lower bodies, said lighting body being provided in an interior thereof with a compartment in which right and left lighting units are mounted, said lighting body being of a shape of a triangle and having outer walls each of which is arranged at an angle of about 45° from a front protrusion of the lighting body, said outer walls having respective openings formed thereon through which lenses of the right and left lighting units mounted in the compartment are exposed;
   said right and left lighting units mounted in the compartment such that fixing protrusions formed in inner surfaces of the upper body and the lower body of the lighting body are engaged into fixing grooves formed in engaging tubes which are of a predetermined length, said engaging tubes with said fixing grooves being formed at upper and lower surfaces of the lighting units; and
   a mounting unit including a mounting plate, wherein at the lower body of the lighting body is formed a projected connecting piece which is engaged into a supporting recess of the mounting plate, and around the connecting piece is formed a friction projection in radial directions, which is joined with a friction member formed on an inner surface of the mounting plate, whereby a mounting angle of the lighting body relative to a road surface can be adjusted;
   said right and left lighting units being independently actuated and deactuated by a microcomputer circuit to which a signal from a sensor operating piece and proximity sensors attached to a steering wheel is transmitted for actuating the auxiliary lighting, said microcomputer circuit actuating the right lighting unit when the steering wheel is turned right, and said microcomputer circuit actuating the left lighting unit when the steering wheel is turned left.

2. A system for auxiliary lighting of right and left bearings for an automobile, comprising:
   a lighting body having a generally triangular shape and having right and left lighting units mounted therein, each of said lighting units having a light source and a lens, said lenses of said right and left lighting units being arranged at an angle of about 45° relative to each other;
   a mounting plate having a friction member formed thereon, said lighting body being pivotally mounted on said mounting plate through said friction member whereby a mounting angle of the lighting body relative to a road surface can be adjusted; and
   said right and left lighting units being independently actuated and deactuated by a microcomputer circuit to which a signal from a sensor operating piece and proximity sensors attached to a steering wheel is transmitted for actuating the auxiliary lighting, said microcomputer circuit actuating the right lighting unit when the steering wheel is turned right, and said microcomputer circuit actuating the left lighting unit when the steering wheel is turned left.

3. The system as set forth in claim 2, wherein said right and left lighting units are mounted in the lighting body such that fixing protrusions formed on inner surfaces of said lighting body are engaged into fixing grooves formed in engaging tubes which are of a predetermined length, said engaging tubes with said fixing grooves being formed at upper and lower surfaces of reflector portions of said lighting units.

4. The system as set forth in claim 2, wherein a projected connecting piece is formed at a lower part of the lighting body, said projected connecting piece engaged into a supporting recess of the mounting plate, and around the connecting piece is formed a friction projection in radial directions, which is joined with said friction member formed on an inner surface of said mounting plate.

5. A system for auxiliary lighting of right and left bearings for an automobile, comprising:
   a lighting body having a front protrusion with openings on either side thereof;

right and left lighting units mounted in said lighting body, each of said lighting units having a light source, a lens and a reflector portion, each of said lenses of said right and left lighting units being arranged in a respective one of said openings on either side of said front protrusion and at an angle of about 45° relative to each other;

a mounting plate to which said lighting body is pivotally mounted through a friction member, a mounting angle of the lighting body relative to a road surface being adjustable through said friction member; and said right and left lighting units being independently actuated and deactuated by a microcomputer circuit to which a signal from a sensor operating piece and proximity sensors attached to a steering wheel is transmitted for actuating the auxiliary lighting, said microcomputer circuit actuating the right lighting unit when the steering wheel is turned right, and said microcomputer circuit actuating the left lighting unit when the steering wheel is turned left.

6. The system as set forth in claim 5, wherein said right and left lighting units are mounted in the lighting body such that fixing protrusions formed on inner surfaces of said lighting body are engaged into fixing grooves formed in engaging tubes which are of a predetermined length, said engaging tubes with said fixing grooves being formed at upper and lower surfaces of said reflector portions of said lighting units.

7. The system as set forth in claim 5, wherein a projected connecting piece is formed at a lower part of the lighting body, said projected connecting piece engaged into a supporting recess of the mounting plate, and around the connecting piece is formed a friction projection in radial directions, which is joined with said friction member formed on an inner surface of said mounting plate.

* * * * *